United States Patent
He et al.

(10) Patent No.: US 12,394,239 B2
(45) Date of Patent: Aug. 19, 2025

(54) PEDESTRIAN RE-IDENTIFICATION METHOD AND DEVICE

(71) Applicants: Beijing Jingdong Shangke Information Technology Co., Ltd., Beijing (CN); Beijing Jingdong Century Trading Co., Ltd., Beijing (CN)

(72) Inventors: Lingxiao He, Beijing (CN); Boqiang Xu, Beijing (CN); Xingyu Liao, Beijing (CN); Wu Liu, Beijing (CN); Tao Mei, Beijing (CN); Bowen Zhou, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 397 days.

(21) Appl. No.: 18/013,795

(22) PCT Filed: May 7, 2021

(86) PCT No.: PCT/CN2021/092020
§ 371 (c)(1),
(2) Date: Dec. 29, 2022

(87) PCT Pub. No.: WO2022/041830
PCT Pub. Date: Mar. 3, 2022

(65) Prior Publication Data
US 2023/0334890 A1 Oct. 19, 2023

(30) Foreign Application Priority Data
Aug. 25, 2020 (CN) .......................... 202010863443.9

(51) Int. Cl.
*G06V 10/42* (2022.01)
*G06V 10/44* (2022.01)
(Continued)

(52) U.S. Cl.
CPC .............. *G06V 40/10* (2022.01); *G06V 10/42* (2022.01); *G06V 10/44* (2022.01); *G06V 10/70* (2022.01); *G06V 10/751* (2022.01)

(58) Field of Classification Search
CPC ........ G06V 40/10; G06V 10/44; G06V 10/42; G06V 10/751
See application file for complete search history.

(56) References Cited

U.S. PATENT DOCUMENTS 10,796,154 B2 * 10/2020 Ostrovsky ............... G06F 16/55
11,049,008 B2 6/2021 Mnih et al.
(Continued)

FOREIGN PATENT DOCUMENTS

| CN | 104142682 A | 11/2014 |
|---|---|---|
| CN | 105637540 A | 6/2016 |

(Continued)

OTHER PUBLICATIONS

Xu et al. "Black re-id: A head-shoulder descriptor for the challenging problem of person re-identification." arXiv, Aug. 19, 2020.*
(Continued)

*Primary Examiner* — Shaghayegh Azima
(74) *Attorney, Agent, or Firm* — Blank Rome LLP (57) ABSTRACT

A method and an electronic device for pedestrian re-identification are provided. The method may include: collecting a target image set including at least two target images, where each target image includes at least one person; extracting a global feature and a head-shoulder feature of each person in each target image in the target image set, where the global feature is an overall appearance feature, and the head-
(Continued)

shoulder feature is a feature of a head part and a shoulder part determining a representation feature of each person in each target image based on the global feature and the head-shoulder feature of each person in each target image; and determining a given person in different target images based on the representation feature of each person in each target image.

20 Claims, 6 Drawing Sheets

(51) Int. Cl.
    *G06V 10/70*           (2022.01)
    *G06V 10/75*           (2022.01)
    *G06V 40/10*           (2022.01)

(56) References Cited

U.S. PATENT DOCUMENTS

| | | | |
|---|---|---|---|
| 11,232,294 B1* | 1/2022 | Banerjee | G06T 7/246 |
| 12,257,478 B1* | 3/2025 | Yao | G06V 40/23 |
| 12,260,450 B2* | 3/2025 | Berger | G06V 40/161 |
| 12,260,530 B2* | 3/2025 | Kumar Singh | G06T 5/60 |
| 2016/0229631 A1 | 8/2016 | Kimura et al. | |
| 2019/0392201 A1* | 12/2019 | Ostrovsky | G06V 20/30 |
| 2021/0150194 A1* | 5/2021 | Wang | G06V 40/103 |
| 2022/0198816 A1* | 6/2022 | Bao | G06V 10/759 |

FOREIGN PATENT DOCUMENTS

| | | | |
|---|---|---|---|
| CN | 105858045 A | | 8/2016 |
| CN | 107628404 A | | 1/2018 |
| CN | 109389589 A | | 2/2019 |
| CN | 109784166 A | * | 5/2019 |
| CN | 110070073 A | * | 7/2019 |
| CN | 110543841 A | * | 12/2019 |
| CN | 112307886 A | | 2/2021 |

OTHER PUBLICATIONS

Li, Dangwei, et al. "Learning deep context-aware features over body and latent parts for person re-identification." Proceedings of the IEEE conference on computer vision and pattern recognition. 2017. (Year: 2017).*
Xu et al. "Black Re-ID: A Head-shoulder Descriptor for the Challenging Problem of Person Re-Identification"; https://doi.org/10.48550/arXiv.2008.08528 ; Aug. 2020. (Year: 2020).*
International Search Report for PCT/CN2021/092020, dated Jul. 19, 2021, 4 pgs.
Chinese Office Action for CN 2020108634439, dated Mar. 11, 2022, 9 pgs.
B. Xu, et al., "Black Re-ID: A Head-shoulder Descriptor for the Challenging Problem of Person Re-Identification", arXiv, Aug. 19, 2020, pp. 1-9.

* cited by examiner

PEDESTRIAN RE-IDENTIFICATION METHOD AND DEVICE

CROSS-REFERENCE TO RELATED APPLICATIONS

This patent application is a national stage of International Application No. PCT/CN2021/092020, filed on May 7, 2021, which claims the priority of Chinese Patent Application No. 202010863443.9, filed on Aug. 25, 2020 and entitled "Pedestrian Re-identification Method and Device". Both of the aforementioned applications are hereby incorporated by reference in their entireties.

TECHNICAL FIELD

The present disclosure relates to the technical field of image identification technology, specifically to the field of computer vision technology, and particularly to a method for pedestrian re-identification, an electronic device and a computer readable medium.

BACKGROUND

Pedestrian re-identification refers to cross-camera retrieval performed on people through the computer vision technology. Existing pedestrian re-identification models mainly rely on attributes such as the colors and styles of the clothing of pedestrians. Accordingly, in the situation where the colors and styles of the clothing of the pedestrians cannot be distinguished, the identification performance of the existing pedestrian re-identification models will be severely degraded.

SUMMARY

Embodiments of the present disclosure propose a method for pedestrian re-identification, an electronic device and a computer readable medium.

In a first aspect, embodiments of the present disclosure provide a method for pedestrian re-identification, and the method includes: collecting a target image set including at least two target images, where each target image includes at least one person; extracting a global feature and a head-shoulder feature of each person in each target image in the target image set, where the global feature is an overall appearance feature, and the head-shoulder feature is a feature of a head part and a shoulder part; determining a representation feature of each person in each target image based on the global feature and the head-shoulder feature of each person in each target image; and determining a given person in different target images based on the representation feature of each person in each target image.

In a second aspect, embodiments of the present disclosure provide an electronic device, and the electronic device includes: one or more processors; and a storage apparatus, configured to store one or more programs, where the one or more programs, when executed by the one or more processors, cause the one or more processors to implement the method as described in any implementations of the first aspect.

In a third aspect, embodiments of the present disclosure provide a computer readable medium, storing a computer program, where the program, when executed by a processor, implements the method as described in any implementations of the first aspect.

BRIEF DESCRIPTION OF THE DRAWINGS

Through detailed descriptions of non-limiting embodiments given with reference to the following accompanying drawings, other features, objectives and advantages of the present disclosure will be more apparent.

DETAILED DESCRIPTION OF EMBODIMENTS

The present disclosure is further described below in detail by combining the accompanying drawings and the embodiments. It may be appreciated that the specific embodiments described herein are merely used for explaining the relevant disclosure, rather than limiting the disclosure. In addition, it should also be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
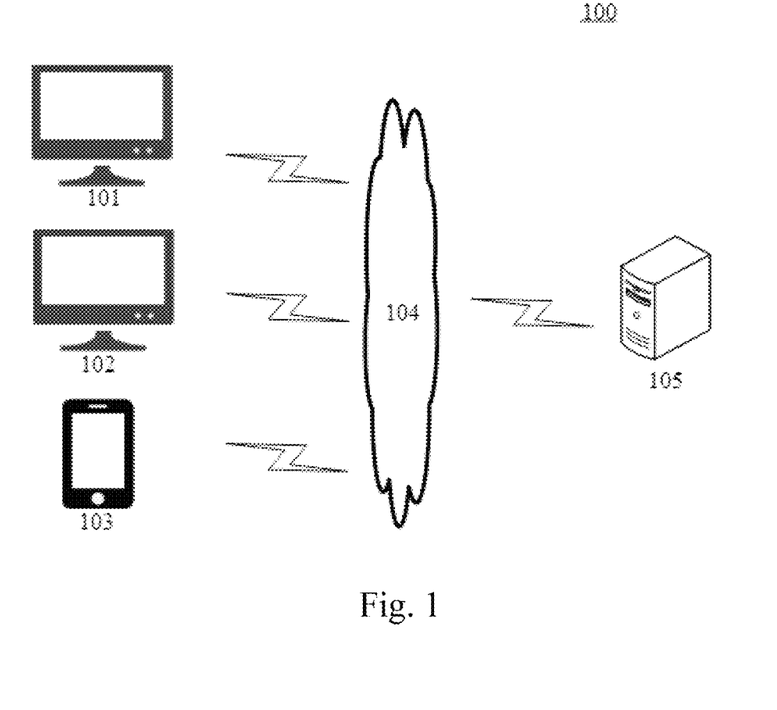
FIG. 1 is a diagram of an exemplary system architecture in which an embodiment of the present disclosure may be applied.

FIG. 1 illustrates an exemplary system architecture 100 in which a method for pedestrian re-identification according to the present disclosure may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, and may generally include wireless communication links, or the like.

The terminal devices 101, 102 and 103 may interact with the server 105 via the network 104, to receive or send a message, etc. Various communication client applications (e.g., an instant communication tool, and a mailbox client) may be installed on the terminal devices 101, 102 and 103.

The terminal devices 101, 102 and 103 may be hardware or software. When being the hardware, the terminal devices 101, 102 and 103 may be user devices having communication and control functions, and the user devices may communicate with the server 105. When being the software, the terminal devices 101, 102 and 103 may be installed on the above user devices. The terminal devices 101, 102 and 103 may be implemented as a plurality of pieces of software or a plurality of software modules (e.g., software or software modules for providing a distributed service), or may be implemented as a single piece of software or a single software module, which will not be specifically limited here.

The server 105 may be a server providing various services, for example, an image server providing support for the image processing system on the terminal devices 101, 102 and 103. The image server may perform analysis processing on the relevant information of each target image in a network, and feed back the processing result (e.g., a pedestrian re-identification strategy) to the terminal devices.

It should be noted that the server may be hardware or software. When being the hardware, the server may be implemented as a distributed server cluster composed of a plurality of servers, or as a single server. When being the software, the server may be implemented as a plurality of pieces of software or a plurality of software modules (e.g., software or software modules for providing a distributed service), or as a single piece of software or a single software module, which will not be specifically limited here.

It should be noted that the method for pedestrian re-identification provided in the embodiments of the present disclosure is generally performed by the server 105.

It should be appreciated that the numbers of the terminal devices, the network and the server in FIG. 1 are merely illustrative. Any number of terminal devices, networks and servers may be provided based on actual requirements.

Figure 2:
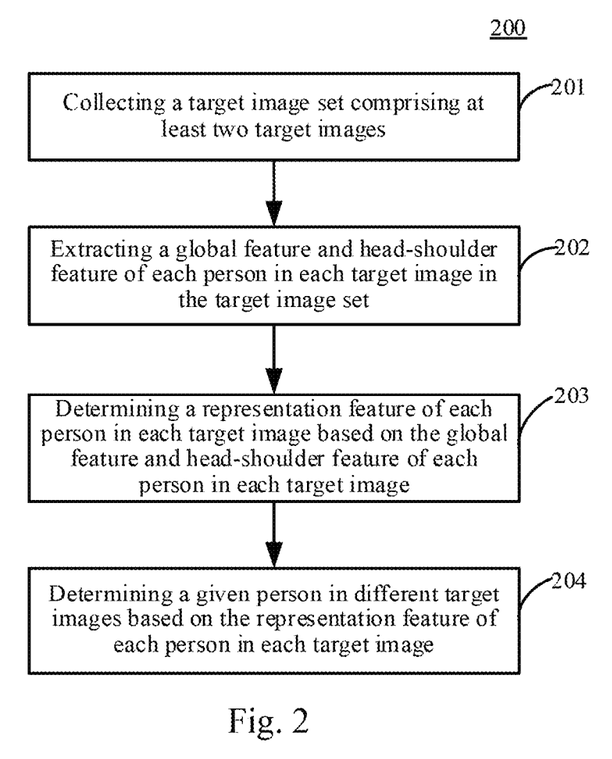
FIG. 2 is a flowchart of an embodiment of a method for pedestrian re-identification according to the present disclosure.

As shown in FIG. 2, FIG. 2 illustrates a flow 200 of an embodiment of a method for pedestrian re-identification according to the present disclosure. The method for pedestrian re-identification includes the following steps.

Step 201, collecting a target image set including at least two target images.

Here, each target image includes at least one person.

In this embodiment, an executing body (e.g., a server or a terminal device) on which the method for pedestrian re-identification runs may acquire the at least two target images in real time or by reading a memory, and use the acquired target images to constitute the target image set.

The number of people in a target image may be one or more than one. When there is a given person in different target images, how to determine the given person from different target images becomes the main work of the executing body on which the method for pedestrian re-identification runs.

Further, the target image may alternatively be an image acquired from a surveillance video. For this target image, a face picture with a very high quality generally cannot be obtained due to the resolution of a camera and a shooting angle. Therefore, the executing body needs to determine the given person in the different target images through an approach other than a face identification.

Furthermore, the target image may alternatively be an image obtained at night or in abnormal weather (cloudy and rainy, foggy, and windy). For this target image, the person in this target image generally cannot be distinguished by the color, style, etc. of the clothing of the person due to the surrounding environment of the person or the fact that all people wear black.

Step 202, extracting a global feature and a head-shoulder feature of each person in each target image in the target image set.

Here, the global feature is an overall appearance feature, and the head-shoulder feature is the feature of a head part and a shoulder part.

In this embodiment, before the global feature of each person in each target image in the target image set is extracted, an image of each person in each target image can be extracted. Based on the characteristic of the image of each person in the target image, the overall appearance feature (the global feature) of each person in each target image is extracted. The global feature is a feature reflecting the appearance of the person in the target image. For example, the global feature includes: the color and style of the clothing or/and the shoes of the person in the target image. It should be noted that, for the target image that is obtained at night or in the abnormal weather, the global feature may include: the style of the clothing or/and the shoes of the person in the target image.

Specifically, the global feature of each person in each target image may be extracted through a global deep learning model or a pedestrian re-identification model. Here, the pedestrian re-identification model is an existing mature model, and may specifically include a spindle network (Spindle Net), a multiple granularity network (MGN), and the like.

Figure 5:
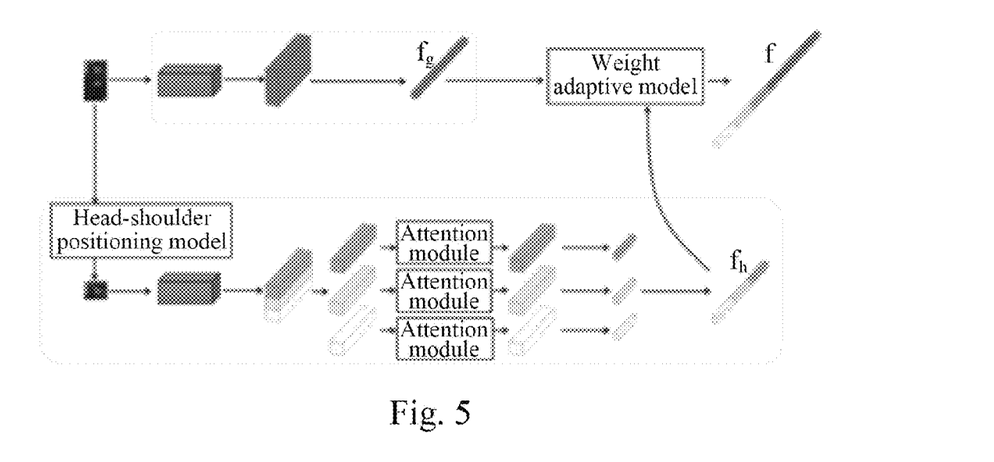
FIG. 5 is a schematic diagram of a specific implementation scenario of the method for pedestrian re-identification according to the present disclosure.

The global deep learning model is a model that is built based on a deep learning algorithm to implement a global feature extraction. The global deep learning model may include one ResNet50 network structure, one global average pooling layer and one convolutional layer, as shown in FIG. 5. For the image of each person in each target image, a feature is first extracted through the ResNet50 network structure, then the feature sequentially passes through the global average pooling layer and the convolutional layer with a convolution kernel of 1*1 for a feature dimension reduction, and finally, a global feature $f_g$ is obtained. Here, the ResNet50 network structure is a residual network having 50 layers, and the residual network is a deep convolutional network. The residual network can be more easily optimized, and can improve the accuracy by increasing a considerable depth. The core technology of the residual network is to solve the side effect of increasing the depth, and thus, the performance of the network can be improved by simply increasing the depth of the network.

In some alternative implementations of this embodiment, extracting the global feature of each person in each target image in the target image set includes:

inputting the image of each person in each target image into a trained global deep learning model to obtain the global feature of each person in each target image, the global feature being outputted by the trained global deep learning model.

In the alternative implementations, the trained global deep learning model is a pre-trained deep learning model. When a global deep learning model is trained, a plurality of person images is first collected as training samples, and preset global features corresponding to the person images are determined. An error of the global deep learning model is determined according to differences between detection results of the global deep learning model for the global features of the training samples and the preset global features corresponding to the training samples, and the parameters of the global deep learning model are iteratively adjusted through an error back propagation, to make the error of the global deep learning model gradually reduced. When the error of the global deep learning model converges to a certain range or the number of iterations reaches a preset number threshold, the adjustment for the parameters can be stopped, thus obtaining the trained global deep learning model.

According to the method of extracting the global feature that is implemented in the alternative implementations, the global deep learning model is adopted to perform a global feature extraction on the image each person in the target image, which improves the efficiency of the extraction for the global feature and ensures the reliability of the extraction for the global feature.

In this embodiment, while extracting the global feature, the executing body may extract the image of each person in each target image, determine a head-shoulder area image in the image of each person based on the image of each person in each target image, and then extract the feature of the head part and shoulder part (the head-shoulder feature) based on the head-shoulder area image in the image of each person. The head-shoulder feature is the character or attribute feature of the person that is related to the head part or shoulder part of the person. For example, the head-shoulder feature includes: a gender, a face, a hairstyle, glasses, a shoulder shape, a scarf, a neck thickness, etc. It should be noted that, for the target image with a low quality, the obtained head-shoulder feature of the person may include: a gender, a hairstyle, glasses, a shoulder shape, a scarf, etc.

Specifically, the head-shoulder feature of each person in each target image may be extracted through a head-shoulder positioning model and a head-shoulder deep learning model. Here, the head-shoulder positioning model may include: one ResNet18 network structure and one fully connected layer. After the training of the head-shoulder positioning model is completed, the image of each person in each target image is first inputted into the ResNet18 network structure to extract a feature, and then the coordinates of a head-shoulder area rectangular box in the image of each person in each target image are outputted through the fully connected layer. The coordinates of the head-shoulder area rectangular box include: the coordinates of the upper-left vertex and the lower-right vertex of the rectangular box, and a head-shoulder area image in the image of each person in each target image can be obtained through the coordinates of the head-shoulder area rectangular box. Here, the ResNet18 network structure is a residual network having 18 layers, and the residual network is a deep convolutional network. The residual network can be more easily optimized, and can improve the accuracy by increasing a considerable depth.

The head-shoulder deep learning model may include: one ResNet50 network structure, three attention modules, three generalized average pooling layers and three convolutional layers, as shown in FIG. 5. After the training of the head-shoulder deep learning model is completed, the head-shoulder area image in the image of each person in each target image that is outputted by the head-shoulder positioning model is inputted into the ResNet50 for a feature extraction, thus obtaining an original head-shoulder feature, and the obtained original head-shoulder feature is horizontally divided into three parts. A feature of each of the three horizontally divided parts is weighted on high response portions in a spatial dimension and channel dimension through its corresponding attention module. Then, each feature sequentially passes through the generalized average pooling layers and one convolutional layer with a convolution kernel of 1*1 for a feature dimension reduction, and the three features obtained after the feature dimension reduction are connected in the channel dimension to obtain a head-shoulder feature $f_h$. In this embodiment, an attention module includes two modules, one of which is a spatial-dimensional attention module and the other of which is a channel-dimensional attention module. The spatial-dimensional attention module and the channel-dimensional attention module respectively strengthen the weights of a high-response spatial area and a high-response channel, which makes the features learned by the network more focus on meaningful and distinguishing parts, thereby increasing the differentiation and robustness of the features.

In some alternative implementations of this embodiment, extracting the head-shoulder feature of each person in each target image in the target image set includes: inputting the image of each person in each target image into the trained head-shoulder positioning model to obtain the head-shoulder area image in the image of each person in each target image, the head-shoulder area image being outputted by the trained head-shoulder positioning model; and inputting the head-shoulder area image in the image of each person in each target image into the trained head-shoulder deep learning model to obtain the head-shoulder feature of each person in each target image, the head-shoulder feature being outputted by the trained head-shoulder deep learning model.

In the alternative implementations, the trained head-shoulder positioning model is used to position the head-shoulder area image in the image of each person in each target image, which is a pre-trained model. During the training for the head-shoulder positioning model, a plurality of person images is first collected as training samples, and the coordinates of preset head-shoulder area rectangular boxes corresponding to the person images are determined. An error of the head-shoulder positioning model is determined according to differences between detection results of the head-shoulder positioning model for the coordinates of the head-shoulder area rectangular boxes of the training samples and the coordinates of the preset head-shoulder area rectangular boxes corresponding to the training samples, and the parameters of the head-shoulder positioning model are iteratively adjusted through an error back propagation, to make the error gradually reduced. When the error of the head-shoulder positioning model converges to a certain range or the number of iterations reaches a preset number threshold, the adjustment for the parameters can be stopped, thus obtaining the trained head-shoulder positioning model.

In the alternative implementations, the trained head-shoulder deep learning model is a pre-trained deep learning model. During the training for the head-shoulder deep learning model, a plurality of head-shoulder area images is first collected as training samples, and preset head-shoulder features corresponding to the head-shoulder area images are determined. An error of the head-shoulder deep learning model is determined according to differences between detection results of the head-shoulder deep learning model for the head-shoulder features of the training samples and the preset head-shoulder features corresponding to training samples, and the parameters of the head-shoulder deep learning model are iteratively adjusted through an error back propagation, to make the error of the head-shoulder deep learning model gradually reduced. When the error of the head-shoulder deep learning model converges to a certain range or the number of iterations reaches a preset number threshold, the adjustment for the parameters can be stopped, thus obtaining the trained head-shoulder deep learning model.

According to the method of extracting the head-shoulder feature that is implemented in the alternative implementations, the image of each person in the target image is positioned using the head-shoulder positioning model to obtain the head-shoulder part area image in the image of each person in the target image, and the head-shoulder feature extraction is performed on the head-shoulder part area image using the head-shoulder deep learning model, thus improving the efficiency of the extraction for the head-shoulder feature, and ensuring the reliability of the extraction for the head-shoulder feature.

Step 203, determining a representation feature of each person in each target image based on the global feature and head-shoulder feature of each person in each target image.

In this embodiment, the representation feature is a feature that represents a substantial characteristic of each person, and each person in each target image can be distinguished through the representation feature.

According to the characteristic of the target image, the way of determining the representation feature is different. As an example, when each target image is clear and the global feature of each person can be identified, the determining a representation feature of each person in each target image based on the global feature and head-shoulder feature of each person in each target image includes: directly connecting the global feature and the head-shoulder feature together to obtain the representation feature.

As another example, when each target image is blurred, each person in the target image wear black, or the global feature of each person in the target image cannot be distinguished, in some alternative implementations of this embodiment, the determining a representation feature of each person in each target image based on the global feature and head-shoulder feature of each person in each target image includes: connecting, for each person in each target image, weighted features of both the global feature and the head-shoulder feature of the person to obtain the representation feature of the person.

In the alternative implementations, the weighted feature are features obtained by multiplying the features by their respective corresponding feature weight values. The feature weight value corresponding to each feature may be obtained through a plurality of channels (e.g., a feature-feature weight value correspondence table or a trained weight model). Here, the feature-feature weight value correspondence table may be a table made in advance by an operator, in which a feature has an one-to-one corresponding relationship with a feature weight value. The trained weight model is a pre-trained feature-feature weight value relationship model, which can output different feature weight values for different features.

Specifically, the weighted feature of the global feature is a feature obtained by multiplying the global feature by the weight value of the global feature. The weighted feature of the head-shoulder feature is a feature obtained by multiplying the head-shoulder feature by the weight value of the head-shoulder feature.

In the alternative implementations, by connecting the weighted features of the global feature and head-shoulder feature of each person in the target image, the representation feature of each person can be quickly and conveniently obtained. Moreover, the obtained representation feature can effectively represent the feature of the person, thereby improving the reliability of subsequent pedestrian re-identification.

Step 204, determining a given person in different target images based on the representation feature of each person in each target image.

In this embodiment, a similarity comparison is performed on the representation features of people in different target images in the target image set. The people respectively corresponding to two representation features having a similarity equal to or greater than a preset similarity are determined as the same person. For example, if the similarity between any two representation features is equal to or greater than 80%, it is determined that the two representation features are the same feature, and the people with the two representation features are the same person.

According to the method for pedestrian re-identification provided in the embodiment of the present disclosure, the target image set including the at least two target images is first collected. Next, the global feature and head-shoulder feature of each person in each target image in the target image set are extracted. Then, the representation feature of each person in each target image is determined based on the global feature and head-shoulder feature of each person in each target image. Finally, the given person in different target images is determined based on the representation feature of each person in each target image. Accordingly, during the pedestrian re-identification, the given person is determined in different target images through the global feature and head-shoulder feature of the person, thereby improving the effect of the identification for the person.

Figure 3:
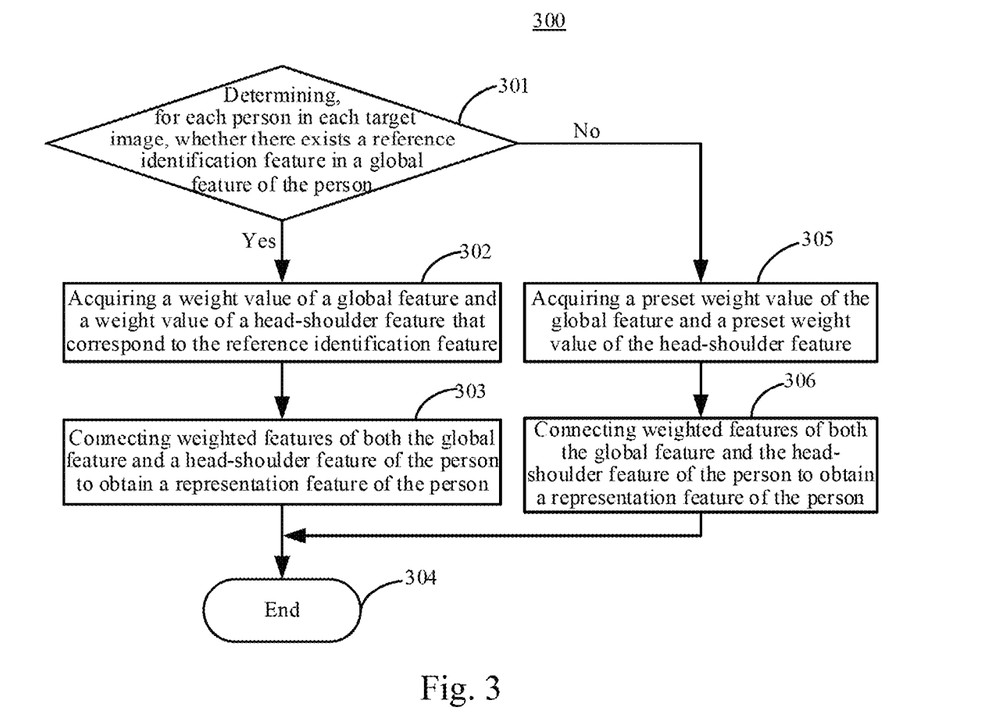
FIG. 3 is a flowchart of an embodiment of a method for obtaining a representation feature of a person according to the present disclosure.

When the target image has a reference identification feature (e.g., low illumination) and thus the person in the target image cannot be well distinguished, in order to obtain a better representation feature, in some alternative implementations of this embodiment, reference is further made to FIG. 3, which illustrates a flow 300 of an embodiment of a method for obtaining a representation feature of a person according to the present disclosure. A method for determining a representation feature of each person in each target image includes the following steps:

Step 301, determining, for each person in each target image, whether a reference identification feature exists in a global feature of the person; and performing step 302 if a determination result is yes. Step 305 is performed if the determination result is no.

In this embodiment, the reference identification feature is characterized as a feature that cannot distinguish a person in the target image, also called a feature of the global feature. For example, the people in the target image are all clothed in black or the whole environment where each person in the target image is is dark, and thus, the color, style, etc. of the clothing of each person cannot be effectively distinguished.

In this embodiment, a head-shoulder feature includes much information of a head part or a shoulder part that can distinguish a person, for example, a gender, a face, a hairstyle and glasses. Moreover, the head-shoulder feature can be collected even under the condition that the people in the target image are all clothed in black or that the whole environment where each person in the target image is is dark.

In some alternative implementations of this embodiment, the reference identification feature includes: brightness of an image of a person being less than a preset brightness value or a color of clothing of the person being black.

In the alternative implementations, the preset brightness value is a preset brightness value. When the brightness of the image of the person in each target image is less than the preset brightness value, it indicates that the image is dark, for example, a low-illumination image. Accordingly, the global feature of the person cannot be effectively distinguished.

In the alternative implementations, the reference identification feature is set to the brightness of the person image being less than the preset brightness value or the color of the clothing of the person being black, which can provide an effective distinguishing condition for obtaining the weight values of the head-shoulder feature and global feature.

Step 302, acquiring a weight value of a global feature and a weight value of a head-shoulder feature that correspond to the reference identification feature, and then performing step 303.

In this embodiment, an executing body on which the method for pedestrian re-identification runs may obtain the weight value of the global feature and the weight value of the head-shoulder feature that correspond to the reference identification feature by searching a reference identification feature-feature weight value correspondence table or a trained weight model. Here, the reference identification feature-feature weight value correspondence table may be a table made in advance by an operator, in which a reference identification feature has a corresponding relationship respectively with a weight value of a global feature and a weight value of a head-shoulder feature. By searching the reference identification feature-feature weight value correspondence table, the weight value of the global feature and the weight value of the head-shoulder feature under a certain reference identification feature can be obtained.

Further, the reference identification feature exists in the global feature, and at this time, the person cannot be effectively identified through the global feature, but the person can be effectively identified through the head-shoulder feature. Therefore, the weight value of the global feature that corresponds to the reference identification feature is less than the weight value of the head-shoulder feature that corresponds to the reference identification feature. The weight value of the global feature and the weight value of the head-shoulder feature that correspond to the reference identification feature may vary with the global feature.

In this embodiment, since the reference identification feature exists in the target image, it is determined that the color of the clothing of the person is black or the whole environment where each person in the target image is dark. At this time, the person cannot be distinguished normally through the global feature. Since the existence of the reference identification feature has little influence on the head-shoulder feature, by making the weight value of the global feature that corresponds to the reference identification feature less than the weight value of the head-shoulder feature that corresponds to the reference identification feature, the proportion of the head-shoulder feature among all the features of the person can be effectively highlighted.

Step 303, connecting weighted features of both the global feature and the head-shoulder feature of the person to obtain a representation feature of the person, and then performing step 304.

In this embodiment, the weighted feature of the global feature is a feature obtained by multiplying the global feature by the weight value of the global feature. The weighted feature of the head-shoulder feature is a feature obtained by multiplying the head-shoulder feature by the weight value of the head-shoulder feature. By connecting the weighted features of both the global feature and the head-shoulder feature of each person in the target image, the representation feature of each person can be quickly and conveniently obtained when the reference identification feature exists in the global feature.

In this embodiment, when the reference identification feature exists in the global feature, the weight value of the global feature and the weight value of the head-shoulder feature that correspond to the reference identification feature are acquired, and the weighted features of both the global feature and the head-shoulder feature of the person are connected to obtain the representation feature of the person. Accordingly, the salience of the head-shoulder feature can be highlighted, and thus, the head-shoulder feature is used as a key object, thereby reflecting the feature of the person, ensuring the re-identification effect of the pedestrian, and improving the efficiency of distinguishing the pedestrian.

Step 304, end.

Step 305, acquiring a preset weight value of the global feature and a preset weight value of the head-shoulder feature, and then performing step 306.

In this embodiment, if the reference identification feature does not exist in the global feature of each person in each target image, it indicates that both the global feature and the head-shoulder feature of each person in each target image can effectively reflect the identifiable feature of each person in the target image, the global feature can effectively guarantee the global effect of the person in the target image, and the head-shoulder feature can effectively guarantee the local effect of the person in the target image. Therefore, at this time, the preset weight value of the global feature and the preset weight value of the head-shoulder feature are two preset fixed values, for example, are 0.5.

Step 306, connecting weighted features of both the global feature and the head-shoulder feature of the person to obtain a representation feature of the person, and then performing step 304.

In this embodiment, when the reference identification feature does not exist in the global feature of each person in the target image, the preset weight value of the global feature and the preset weight value of the head-shoulder feature are acquired, and the weighted features of both the global feature and the head-shoulder feature of the person are connected to obtain the representation feature of the person. Accordingly, the balance between the global feature and the head-shoulder feature can be highlighted, such that the obtained representation feature can effectively represent the identification feature of the person, thereby improving the distinguishing efficiency during the pedestrian re-identification.

In summary, according to the method for obtaining a representation feature of a person provided in this embodiment, when the reference identification feature exists in the global feature, the weight value of the global feature and the weight value of the head-shoulder feature that correspond to the reference identification feature are acquired, and the weighted features of both the global feature and the head-shoulder feature of the person are connected to obtain the representation feature of the person. When the reference identification feature does not exist in the global feature of each person in the target image, the preset weight value of the global feature and the preset weight value of the head-shoulder feature are acquired, and the weighted features of both the global feature and the head-shoulder feature of the person are connected to obtain the representation feature of the person. Accordingly, when the reference identification feature exists, the salience of the head-shoulder feature can be highlighted, and thus, the head-shoulder feature is used as a key object. When the reference identification feature does not exist, the global feature and the head-shoulder feature can be reasonably balanced. Therefore, the effect of the pedestrian re-identification is ensured, and the distinguishing efficiency during pedestrian re-identification is improved.

Figure 4:
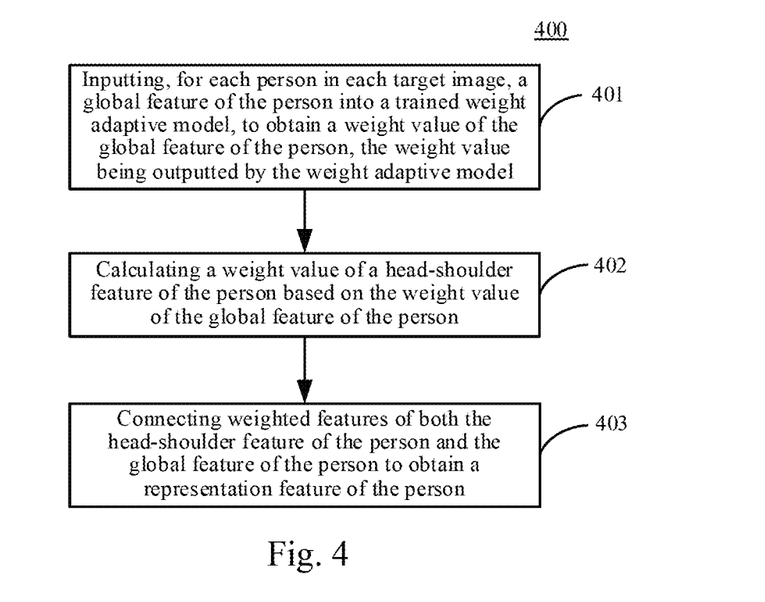
FIG. 4 is a flowchart of an embodiment of a method for determining a representation feature of each person in each target image according to the present disclosure.

In some alternative implementations of this embodiment, further referring to FIG. 4, FIG. 4 illustrates a flow 400 of an embodiment of a method for determining a representation feature of each person in each target image according to the present disclosure. The method for determining a representation feature of each person in each target image includes the following steps:

Step 401, inputting, for each person in each target image, a global feature of the person into a trained weight adaptive model, to obtain a weight value of the global feature of the person, the weight value being outputted by the weight adaptive model.

In this embodiment, as shown in FIG. 5, the input of the weight adaptive model is a global feature $f_g$, and the output of the weight adaptive model is the weight value of the global feature.

Specifically, the weight adaptive model may include: two fully connected layers connected in sequence. The first fully connected layer may determine whether there is a reference identification feature based on the global feature. The second fully connected layer receives the identification result of the first fully connected layer, and outputs the weight value of the global feature.

In this alternative implementation, the trained weight adaptive model may be a pre-trained deep learning model. When a weight adaptive model is trained, a plurality of global features and the head-shoulder features corresponding to the global features are first collected, and the collected global features are used as training samples (here, the plurality of global features may be global features obtained during the training for the global deep learning model in the above embodiment, and the head-shoulder features corresponding to the global features may be head-shoulder features obtained during the training for the head-shoulder deep learning model in the above embodiment). Preset representation features corresponding to the global features and a preset determination result corresponding to an output value of the first fully connected layer are determined. Representation features are calculated according to the prediction result of the weight adaptive model for the weight values of the global features of the training samples and the head-shoulder features corresponding to the global features. An error of the weight adaptive model is determined according to a difference between the calculated representation features and the preset representation features corresponding to the training samples and a difference between a determination result of the first fully connected layer and the preset determination result corresponding to the training samples. The parameters of the weight adaptive model are iteratively adjusted through an error back propagation, to make the error of the weight adaptive model gradually reduced. When the error of the weight adaptive model converges to a certain range or the number of iterations reaches a preset number threshold, the adjustment for the parameters can be stopped, thus obtaining the trained weight adaptive model.

In this embodiment, according to the global feature of an inputted picture, the weight adaptive model may respectively assign different optimal weights to the global feature and the head-shoulder feature. For example, the weight adaptive model first determines, through the global feature, whether the inputted picture belongs to "a low-illumination picture in which the people are all clothed in black." If the inputted picture belongs to the picture, then the weight adaptive model will give a larger weight value to the head-shoulder feature.

Step 402, calculating a weight value of a head-shoulder feature of the person based on the weight value of the global feature of the person.

In this embodiment, the sum of the weight value of the head-shoulder feature and the weight value of the global feature is 1. After the weight value of the global feature is obtained, the weight value of the head-shoulder feature can be obtained by subtracting the weight value of the global feature from 1.

Step 403, connecting weighted features of both the head-shoulder feature of the person and the global feature of the person to obtain a representation feature of the person.

Specifically, in FIG. 5, the representation feature of the person is f. Through the weight adaptive model, the global feature $f_g$ the head-shoulder feature $f_h$ are merged to obtain the representation feature f of the person.

According to the method for determining a representation feature of each person in each target image provided in this embodiment, the weight value of the global feature is allocated to the global feature using the weight adaptive model, the weight value of the head-shoulder feature is obtained from the weight value of the global feature, and the weighted features of both the head-shoulder feature and the global feature of the person are connected to obtain the representation feature of the person. Therefore, the adaptive allocation for the weight values of the head-shoulder feature and the global feature is implemented using the weight adaptive model, thereby improving the adaptability of the representation feature, and improving the identification effect during pedestrian re-identification.

Figure 6:
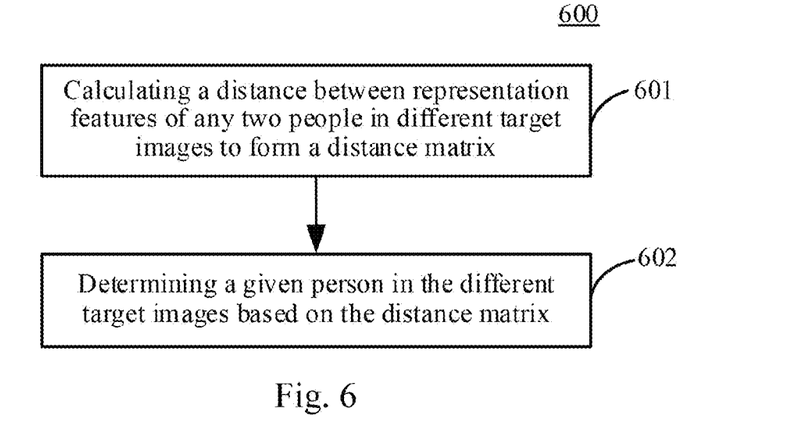
FIG. 6 is a flowchart of determining a given person in different target images according to the present disclosure.

In some alternative implementations of this embodiment, further referring to FIG. 6, FIG. 6 illustrates a flow 600 of determining a given person in different target images according to the present disclosure. A method for determining a given person in different target images includes the following steps:

Step 601, calculating a distance between representation features of any two people in different target images to form a distance matrix.

In this embodiment, a Euclidean distance between the representation features of any two people may be calculated through a Euclidean calculation formula, or a cosine distance between the representation features of any two people may be calculated through a cosine calculation formula.

A position annotation is performed on each person in each target image in the target image set, and thus, the distance matrix is formed based on the position of each person. Specifically, the distance between the two representation features is expressed in the distance matrix in the form of $d_{ij}$. Here, the positions of the people corresponding to the two representation features in different target images are respectively i and j. For example, if i is 1103, it indicates the person is at the third sorted position in the 11-th target image.

Step 602, determining a given person in the different target images based on the distance matrix.

In this embodiment, whether the people in different target images are the same is related to the distance between the representation features of the people. When the distance between the representation features of two people in the distance matrix is within a preset distance value, it may be determined that the two people are the same person. Alternatively, the distance value between the representation features of any two people in the distance matrix may be sorted in a descending order, and representation features of people that correspond to top N (N being a preset number, e.g., 5) distance values are selected as the determination objects of the same person. In these objects, the smaller distance value indicates the higher similarity of the people, and thus, it is more likely to consider that the people are the same person.

The same person in different target images can be conveniently and quickly found through the distance matrix.

According to the method for determining a given person in different target images provided in this embodiment, the distance between the representation features of any two people in the different target images is calculated to form the distance matrix, and the given person in the different target images is determined based on the distance matrix. Accordingly, through the distance matrix, it is possible to conveniently and quickly determine the distance between the representation features of people and determine the given person in the target images, thereby improving the efficiency of the pedestrian re-identification.

Figure 7:
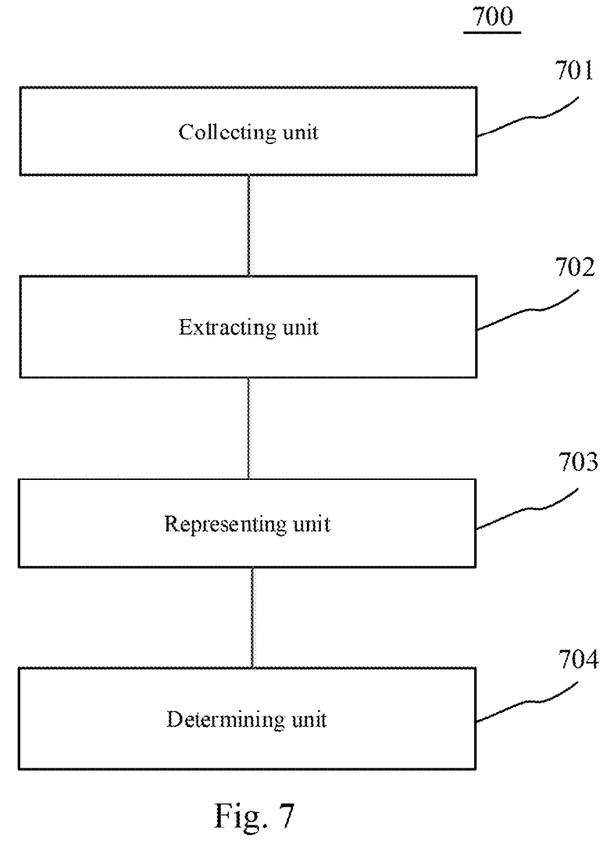
FIG. 7 is a schematic structural diagram of an embodiment of an apparatus for pedestrian re-identification according to the present disclosure.

Further referring to FIG. 7, as an implementation of the method shown in the above drawings, the present disclosure provides an embodiment of an apparatus for pedestrian re-identification. The embodiment of the apparatus corresponds to the embodiment of the method shown in FIG. 2. The apparatus may be applied in various electronic devices.

As shown in FIG. 7, the embodiment of the present disclosure provides an apparatus 700 for pedestrian re-identification, the apparatus 700 including: a collecting unit 701, an extracting unit 702, a representing unit 703 and a determining unit 704. Here, the collecting unit 701 may be configured to collect a target image set including at least two target images. Each target image includes at least one person. The extracting unit 702 may be configured to extract a global feature and a head-shoulder feature of each person in each target image in the target image set. Here, the global feature is an overall appearance feature, and the head-shoulder feature is a feature of a head part and a shoulder part. The representing unit 703 may be configured to determine a representation feature of each person in each target image based on the global feature and the head-shoulder feature of each person in each target image. The determining unit 704 may be configured to determine a given person in different target images based on the representation feature of each person in each target image.

In this embodiment, for specific processes of the collecting unit 701, the extracting unit 702, the representing unit 703 and the determining unit 704 in the apparatus 700 for pedestrian re-identification, and their technical effects, reference may be respectively made to step 201, step 202, step 203 and step 204 in the corresponding embodiment of FIG. 2.

In some embodiments, the representing unit 703 includes: a representing module (not shown). The representing module may be configured to connect, for each person in each target image, weighted features of both the global feature and the head-shoulder feature of the person to obtain the representation feature of the person.

In some embodiments, the representing module further includes: a first acquiring submodule (not shown) and a first connecting submodule (not shown). The first acquiring sub-module may be configured to acquire, for each person in each target image, a weight value of the global feature and a weight value of the head-shoulder feature that correspond to a reference identification feature if the reference identification feature exists in the global feature of the person. The first connecting sub-module may be configured to connect the weighted features of both the global feature and the head-shoulder feature of the person to obtain the representation feature of the person.

In some embodiments, the representing module further includes: a second acquiring sub-module (not shown) and a second connecting sub-module (not shown). The second acquiring sub-module is configured to acquire, for each person in each target image, a preset weight value of the global feature and a preset weight value of the head-shoulder feature if the reference identification feature does not exist in the global feature of the person. The second connecting sub-module is configured to connect the weighted features of both the global feature and the head-shoulder feature of the person to obtain the representation feature of the person.

In some embodiments, the reference identification feature includes: brightness of an image of a person being less than a preset brightness value or a color of clothing of the person being black.

In some embodiments, the representing unit 703 includes: an acquiring module (not shown), an obtaining module (not shown) and a connecting module (not shown). The acquiring module may be configured to input, for each person in each target image, the global feature of the person into a trained weight adaptive model, to obtain a weight value of the global feature of the person, the weight value being outputted by the weight adaptive model. The obtaining module may be configured to calculate a weight value of the head-shoulder feature of the person based on the weight value of the global feature of the person. The connecting module may be configured to connect the weighted features of both the head-shoulder feature of the person and the global feature of the person to obtain the representation feature of the person.

In some embodiments, the determining unit 704 includes: a calculating module (not shown) and a determining module (not shown). The calculating module may be configured to calculate a distance between representation features of any two people in the different target images to form a distance matrix. The determining module may be configured to determine the given person in the different target images based on the distance matrix.

In some embodiments, the extracting unit 702 includes: a global extracting module (not shown). The global extracting module may be configured to input an image of each person in each target image into a trained global deep learning model to obtain the global feature of each person in each target image, the global feature being outputted by the trained global deep learning model.

In some embodiments, the extracting unit 702 includes: an image extracting module (not shown) and a head-shoulder extracting module (not shown). The image extracting module may be configured to input the image of each person in each target image into a trained head-shoulder positioning model to obtain a head-shoulder area image in the image of each person in each target image, the head-shoulder area image being outputted by the trained head-shoulder positioning model. The head-shoulder extracting module may be configured to input the head-shoulder area image in the image of each person in each target image into a trained head-shoulder deep learning model to obtain the head-shoulder feature of each person in each target image, the head-shoulder feature being outputted by the trained head-shoulder deep learning model.

According to the method and apparatus for pedestrian re-identification provided in the embodiment of the present disclosure, the collecting unit 701 first collects the target image set including the at least two target images. Next, the extracting unit 702 extracts the global feature and the head-shoulder feature of each person in each target image in the target image set. Then, the representing unit 703 determines the representation feature of each person in each target image based on the global feature and the head-shoulder feature of each person in each target image. Finally, the determining unit 704 determines the given person in different target images based on the representation feature of each person in each target image. Accordingly, during the pedestrian re-identification, the given person is determined in different target images through the global feature and the head-shoulder feature of the person, thereby improving the effect of the identification for the person.

Figure 8:
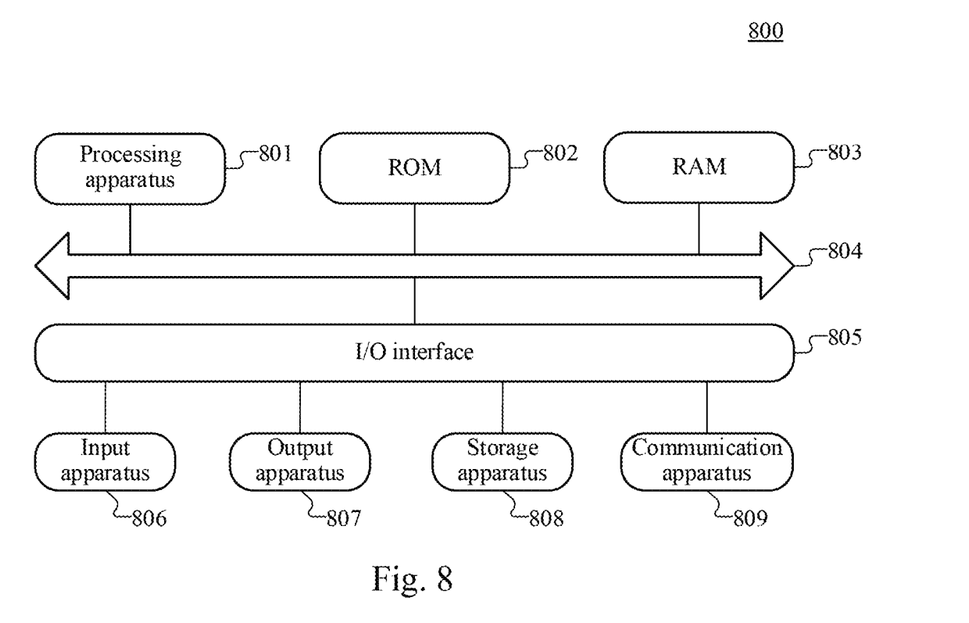
FIG. 8 is a schematic structural diagram of an electronic device adapted to implement the embodiments of the present disclosure.

Further referring to FIG. 8, FIG. 8 is a schematic structural diagram of an electronic device 800 adapted to implement the embodiments of the present disclosure.

As shown in FIG. 8, the electronic device 800 may include a processing apparatus 801 (e.g., a central processing unit or a graphics processing unit), which may execute various appropriate actions and processes in accordance with a program stored in a read only memory (ROM) 802 or a program loaded into a random-access memory (RAM) 803 from a storage apparatus 808. The RAM 803 further stores various programs and data required by operations of the electronic device 800. The CPU 801, the ROM 802, and the RAM 803 are connected to each other through a bus 804. An input/output (I/O) interface 805 is also connected to the bus 804.

In general, the following apparatuses may be connected to the I/O interface 805: an input apparatus 806 including a touch screen, a touch pad, a keyboard, a mouse, or the like; an output apparatus 807 including a liquid crystal display device (LCD), a speaker, a vibrator, or the like; a storage apparatus 808 including a magnetic tape, a hard disk, or the like; and a communication apparatus 809. The communication apparatus 809 may allow the electronic device 800 to exchange data with other devices through wireless or wired communication. While FIG. 8 shows the electronic device 800 having various apparatuses, it should be understood that it is not necessary to implement or provide all of the apparatuses shown in the figure. More or fewer apparatuses may be alternatively implemented or provided. Each block shown in FIG. 8 may represent an apparatus, or represent a plurality of apparatuses as required.

In particular, according to the embodiments of the present disclosure, the process described above with reference to the flow chart may be implemented as a computer software program. For example, the embodiments of the present disclosure include a computer program product, which includes a computer program that is tangibly embedded in a computer readable medium. The computer program includes a program code for executing the method as shown in the flow chart. In such an embodiment, the computer program may be downloaded and installed from a network via the communication apparatus 809, or be installed from the storage apparatus 808, or be installed from the ROM 802. The computer program, when executed by the processing apparatus 801, implements the above functions as defined by the method of the embodiments of the present disclosure. It should be noted that the computer readable medium of the embodiments of the present disclosure may be a computer readable signal medium or a computer readable storage medium, or any combination of the above two. An example of the computer readable storage medium may include, but is not limited to: electric, magnetic, optical, electromagnetic, infrared, or semiconductor systems, apparatuses, elements, or a combination of any of the above. A more specific example of the computer readable storage medium may include, but is not limited to: an electrical connection with one or more pieces of wire, a portable computer disk, a hard disk, a random-access memory (RAM), a read only memory (ROM), an erasable programmable read-only memory (EPROM or flash memory), an optical fiber, a portable compact disk read-only memory (CD-ROM), an optical memory, a magnetic memory, or any suitable combination of the above. In the embodiments of the present disclosure, the computer readable storage medium may be any tangible medium containing or storing programs which may be used by, or used in combination with, a command execution system, apparatus or element. In the embodiments of the present disclosure, the computer readable signal medium may include a data signal in the base band or propagating as a part of a carrier wave, in which a computer readable program code is carried. The propagating data signal may take various forms, including but not limited to an electromagnetic signal, an optical signal, or any suitable combination of the above. The computer readable signal medium may also be any computer readable medium except for the computer readable storage medium. The computer readable signal medium is capable of transmitting, propagating or transferring programs for use by, or use in combination with, a command execution system, apparatus or element. The program code contained on the computer readable medium may be transmitted with any suitable medium, including but not limited to: wire, an optical cable, a RF (radio frequency) medium etc., or any suitable combination of the above.

The above computer readable medium may be the computer readable medium included in the above server, or a stand-alone computer readable medium not assembled into the server. The above computer readable medium carries one or more programs. The one or more programs, when executed by the server, cause the server to: collect a target image set including at least two target images, where each target image includes at least one person; extract a global feature and a head-shoulder feature of each person in each target image in the target image set, where the global feature is an overall appearance feature, and the head-shoulder feature is a feature of a head part and a shoulder part; determine a representation feature of each person in each target image based on the global feature and head-shoulder feature of each person in each target image; and determine a given person in different target images based on the representation feature of each person in each target image.

A computer program code for executing operations in the embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the case where a remote computer is involved, the remote computer may be connected to a user computer through any kind of networks, including a local area network (LAN) or a wide area network (WAN), or may be connected to an external computer (for example, connected through the Internet using an Internet service provider).

The flow charts and block diagrams in the figures illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, functions annotated in the blocks may also occur in an order different from the order annotated in the figures. For example, any two blocks presented in succession may be executed substantially in parallel, or sometimes be executed in a reverse sequence, depending on the functions involved. It should also be noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The described units involved in the embodiments of the present disclosure may be implemented by means of software or hardware. The described unit can alternatively be provided in a processor, which, for example, can be described as: a processor including a collecting unit, an extracting unit, a representing unit and a determining unit. Here, the names of these units do not in some cases constitute a limitation to such units themselves. For example, the collecting unit may alternatively be described as "a unit configured to collect a target image set including at least two target images, each target image including at least one person."

The above description only provides explanation of the preferred embodiments and the employed technical principles of the present disclosure. It should be appreciated by those skilled in the art that the inventive scope involved in embodiments of the present disclosure is not limited to the technical solutions formed by the particular combinations of the above technical features. The inventive scope should also cover other technical solutions formed by any combination of the above technical features or equivalent features thereof without departing from the inventive concept of the present disclosure, for example, the technical solutions formed by interchanging the above features with, but not limited to, technical features with similar functions disclosed in the embodiments of the present disclosure.

What is claimed is:

1. A computer-implemented method for pedestrian re-identification, comprising:
    collecting a target image set comprising at least two target images, wherein each target image comprises at least one person;
    extracting, using respective pre-trained models, a global feature and a head-shoulder feature of each person in the each target image in the target image set, wherein the global feature is an overall appearance feature, and the head-shoulder feature is a feature of a head part and a shoulder part;
    determining a representation feature of the each person in the each target image based on the global feature and the head-shoulder feature of the each person in the each target image; and
    determining whether a given person in different target images is the same person by assessing similarity between the respective representation feature of the each person in the each target image;
    wherein the determining a representation feature of the each person in the each target image based on the global feature and head-shoulder feature of the each person in the each target image comprises:
    acquiring, for the each person in the each target image, a weight value of the global feature and a weight value of the head-shoulder feature that correspond to a reference identification feature in the global feature of the person, wherein the weight value of the global feature that corresponds to the reference identification feature is less than the weight value of the head-shoulder feature that corresponds to the reference identification feature, and the weight value of the global feature and the weight value of the head-shoulder feature that correspond to the reference identification feature vary with the global feature; and
    connecting the weighted features of both the global feature and the head-shoulder feature of the person to obtain the representation feature of the person.

2. The method according to claim 1, wherein the connecting, for the each person in the each target image, weighted features of both the global feature and the head-shoulder feature of the person to obtain the representation feature of the person further comprises:
    acquiring a preset weight value of the global feature and a preset weight value of the head-shoulder feature if the reference identification feature does not exist in the global feature of the person; and
    connecting the weighted features of both the global feature and the head-shoulder feature of the person to obtain the representation feature of the person.

3. The method according to claim 1, wherein the reference identification feature comprises: brightness of an image of a person in the target image being less than a preset brightness value, and/or a color of clothing of the or each person in the target image being black, and/or each target image is blurred.

4. The method according to claim 1, wherein the determining a representation feature of the each person in the each target image based on the global feature and the head-shoulder feature of the each person in the each target image comprises:
    inputting, for the each person in the each target image, the global feature of the person into a trained weight adaptive model, to obtain a weight value of the global feature of the person, the weight value being outputted by the weight adaptive model;
    calculating a weight value of the head-shoulder feature of the person based on the weight value of the global feature of the person; and
    connecting the weighted features of both the head-shoulder feature of the person and the global feature of the person to obtain the representation feature of the person.

5. The method according to claim 1, wherein the determining a given person in different target images based on the representation feature of the each person in the each target image comprises:
    calculating a distance between representation features of any two people in the different target images to form a distance matrix; and
    determining the given person in the different target images based on the distance matrix.

6. The method according to claim 1, wherein extracting the global feature of the each person in the each target image in the target image set comprises:
    inputting an image of the each person in the each target image into a trained global deep learning model to obtain the global feature of the each person in the each target image, the global feature being outputted by the trained global deep learning model.

7. The method according to claim 1, wherein extracting the head-shoulder feature of the each person in the each target image in the target image set comprises:
    inputting the image of the each person in the each target image into a trained head-shoulder positioning model to obtain a head-shoulder area image in the image of the each person in the each target image, the head-shoulder area image being outputted by the trained head-shoulder positioning model; and inputting the head-shoulder area image in the image of the each person in the each target image into a trained head-shoulder deep learning model to obtain the head-shoulder feature of the each person in the each target image, the head-shoulder feature being outputted by the trained head-shoulder deep learning model.

8. The method according to claim 1, wherein the head-shoulder feature comprises one or more of: a gender, a face, a hairstyle, glasses, a shoulder shape, a scarf, a neck thickness.

9. An electronic device, comprising:
one or more processors; and
a storage apparatus, configured to store one or more programs,
wherein the one or more programs, when executed by the one or more processors, cause the one or more processors to perform operations comprising:
collecting a target image set comprising at least two target images, wherein each target image comprises at least one person;
extracting, using respective pre-trained models, a global feature and a head-shoulder feature of each person in the each target image in the target image set, wherein the global feature is an overall appearance feature, and the head-shoulder feature is a feature of a head part and a shoulder part;
determining a representation feature of the each person in the each target image based on the global feature and the head-shoulder feature of the each person in the each target image; and
determining whether a given person in different target images is the same person by assessing similarity between the respective representation feature of the each person in the each target image;
wherein the determining a representation feature of the each person in the each target image based on the global feature and head-shoulder feature of the each person in the each target image comprises:
acquiring, for the each person in the each target image, a weight value of the global feature and a weight value of the head-shoulder feature that correspond to a reference identification feature in the global feature of the person, wherein the weight value of the global feature that corresponds to the reference identification feature is less than the weight value of the head-shoulder feature that corresponds to the reference identification feature, and the weight value of the global feature and the weight value of the head-shoulder feature that correspond to the reference identification feature vary with the global feature; and
connecting the weighted features of both the global feature and the head-shoulder feature of the person to obtain the representation feature of the person.

10. The electronic device according to claim 9, wherein the connecting, for the each person in the each target image, weighted features of both the global feature and the head-shoulder feature of the person to obtain the representation feature of the person further comprises:
acquiring a preset weight value of the global feature and a preset weight value of the head-shoulder feature if the reference identification feature does not exist in the global feature of the person; and
connecting the weighted features of both the global feature and the head-shoulder feature of the person to obtain the representation feature of the person.

11. The electronic device according to claim 10, wherein the reference identification feature comprises: brightness of an image of a person in the target image being less than a preset brightness value, and/or a color of clothing of the or each person in the target image being black, and/or each target image is blurred.

12. The electronic device according to claim 9, wherein the determining a representation feature of the each person in the each target image based on the global feature and the head-shoulder feature of the each person in the each target image comprises:
inputting, for the each person in the each target image, the global feature of the person into a trained weight adaptive model, to obtain a weight value of the global feature of the person, the weight value being outputted by the weight adaptive model;
calculating a weight value of the head-shoulder feature of the person based on the weight value of the global feature of the person; and
connecting the weighted features of both the head-shoulder feature of the person and the global feature of the person to obtain the representation feature of the person.

13. The electronic device according to claim 9, wherein the determining a given person in different target images based on the representation feature of the each person in the each target image comprises:
calculating a distance between representation features of any two people in the different target images to form a distance matrix; and
determining the given person in the different target images based on the distance matrix.

14. The electronic device according to claim 9, wherein extracting the global feature of the each person in the each target image in the target image set comprises:
inputting an image of the each person in the each target image into a trained global deep learning model to obtain the global feature of the each person in the each target image, the global feature being outputted by the trained global deep learning model.

15. The electronic device according to claim 9, wherein extracting the head-shoulder feature of the each person in the each target image in the target image set comprises:
inputting the image of the each person in the each target image into a trained head-shoulder positioning model to obtain a head-shoulder area image in the image of the each person in the each target image, the head-shoulder area image being outputted by the trained head-shoulder positioning model; and
inputting the head-shoulder area image in the image of the each person in the each target image into a trained head-shoulder deep learning model to obtain the head-shoulder feature of the each person in the each target image, the head-shoulder feature being outputted by the trained head-shoulder deep learning model.

16. The electronic device according to claim 9, wherein the head-shoulder feature comprises one or more of: a gender, a face, a hairstyle, glasses, a shoulder shape, a scarf, a neck thickness.

17. A non-transitory computer readable medium, storing a computer program, wherein the program, when executed by a processor, implements operations comprising:
collecting a target image set comprising at least two target images, wherein each target image comprises at least one person;
extracting, using respective pre-trained models, a global feature and a head-shoulder feature of each person in the each target image in the target image set, wherein the global feature is an overall appearance feature, and the head-shoulder feature is a feature of a head part and a shoulder part;

determining a representation feature of the each person in the each target image based on the global feature and the head-shoulder feature of the each person in the each target image; and determining whether a given person in different target images is the same person by assessing similarity between the respective representation feature of the each person in the each target image;

wherein the determining a representation feature of the each person in the each target image based on the global feature and head-shoulder feature of the each person in the each target image comprises:

acquiring, for the each person in the each target image, a weight value of the global feature and a weight value of the head-shoulder feature that correspond to a reference identification feature in the global feature of the person, wherein the weight value of the global feature that corresponds to the reference identification feature is less than the weight value of the head-shoulder feature that corresponds to the reference identification feature, and the weight value of the global feature and the weight value of the head-shoulder feature that correspond to the reference identification feature vary with the global feature; and connecting the weighted features of both the global feature and the head-shoulder feature of the person to obtain the representation feature of the person.

18. The non-transitory computer readable medium according to claim 17, wherein the reference identification feature comprises: brightness of an image of a person in the target image being less than a preset brightness value, and/or a color of clothing of the or each person in the target image being black, and/or each target image is blurred.

19. The non-transitory computer readable medium according to claim 18, wherein the determining a representation feature of the each person in the each target image based on the global feature and the head-shoulder feature of the each person in the each target image comprises:

inputting, for the each person in the each target image, the global feature of the person into a trained weight adaptive model, to obtain a weight value of the global feature of the person, the weight value being outputted by the weight adaptive model;

calculating a weight value of the head-shoulder feature of the person based on the weight value of the global feature of the person; and connecting the weighted features of both the head-shoulder feature of the person and the global feature of the person to obtain the representation feature of the person.

20. The non-transitory computer readable medium according to claim 18, wherein the head-shoulder feature comprises one or more of: a gender, a face, a hairstyle, glasses, a shoulder shape, a scarf, a neck thickness.

* * * * *